United States Patent
Burrell et al.

(10) Patent No.: US 8,265,482 B2
(45) Date of Patent: Sep. 11, 2012

(54) DEVICE AND METHOD TO ALLOW FOR UNI-DIRECTIONAL TRAFFIC ON LOCAL AREA NETWORKS

(75) Inventors: Gary R. Burrell, Wyckoff, NJ (US); Sheng Wu, Irvington, NY (US)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 12/572,903

(22) Filed: Oct. 2, 2009

(65) Prior Publication Data
US 2011/0081145 A1 Apr. 7, 2011

(51) Int. Cl.
*H04J 14/00* (2006.01)
*H04B 10/24* (2006.01)

(52) U.S. Cl. .......... 398/58; 398/9; 398/15; 398/17; 398/22; 398/25; 398/41; 398/66; 398/135; 398/137

(58) Field of Classification Search .............. None
See application file for complete search history.

(56) References Cited

U.S. PATENT DOCUMENTS 6,501,871 B1 * 12/2002 Sucharczuk et al. ............ 385/24
7,778,549 B1 * 8/2010 Binetti et al. .................... 398/83
2003/0219255 A1 * 11/2003 Jaggi et al. ..................... 398/139
2005/0213970 A1 * 9/2005 Kimura et al. .................. 398/45
2007/0258715 A1 * 11/2007 Androni et al. ................. 398/79

OTHER PUBLICATIONS

IEEE Standard for Information Technology- Telecommunications and information exchange between systems- Local and metropolitan area networks- Specific requirements Part 3: Carrier Sense Multiple Access with Collision Detection (CSMA/CD) access method and Physical Layer specifications, Section Five: (Third printing: Jun. 22, 2010.).

* cited by examiner

*Primary Examiner* — Li Liu
(74) *Attorney, Agent, or Firm* — Murphy & King, P.C.

(57) ABSTRACT

A communication network access device is adapted for duplex communication and provides transmit and receive signal paths. A controllable socket is coupled to the transmit and receive signal paths and linked to a control interface for activating/deactivating the control interface. A pluggable module is coupled to the transmit and receive signal paths via the controllable socket in an activated status and to a transmission path carrying uni-directional signals. The module includes a first optical device and a splitter in the transmission path and is coupled to a second optical device via the splitter. The second optical device responds to a portion of uni-directional signals provided by the splitter for placing the communication access device in a link up condition for uni-directional signals provided by the first optical device to the transmission path serving an optical local area network.

20 Claims, 2 Drawing Sheets

DEVICE AND METHOD TO ALLOW FOR UNI-DIRECTIONAL TRAFFIC ON LOCAL AREA NETWORKS

FIELD

Figure 1:
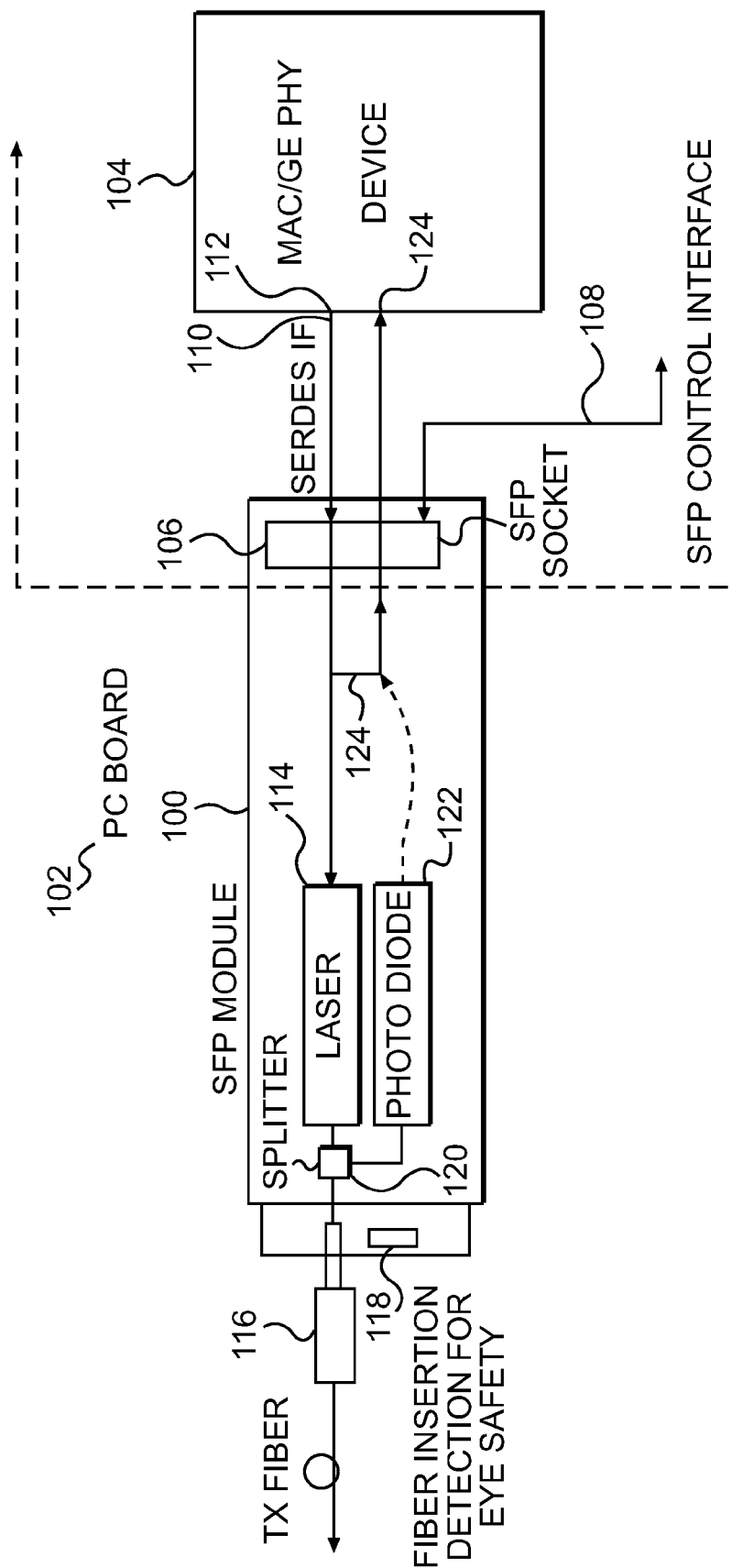

This invention relates to communication devices and methods for local area networks (LAN) involving communication devices and methods for Ethernet uni-directional traffic on LANs.

BACKGROUND

Ethernet exists as a combination of twisted pair cables along with fiber optic versions connecting end systems to networks. Ethernet is standardized in IEEE 802.3 for Local Area Network (LAN) protocols. 802.3 exists in several varieties including 10, 100, 1000 Megabytes per Second (Mbps) with physical interfaces supporting bi-directional traffic, that is, transmit and receive traffic. An important characteristic of 802.3 versions is that only duplex systems are supported by the standard as described in 802.3, clause 56, particularly clause 56.1. Accordingly, uni-directional Ethernet is not supported by 802.3.

Uni-directional Ethernet supports one-way traffic across a single fiber strand. Uni-directional links are useful for applications, such as broadband video services where almost all traffic flow is in one direction. The links conserve bandwidth by enabling the link to be differentially dedicated to transmit and receive interfaces. Also, the number of ports is conserved because the transmit-only and receive-only interfaces act independently.

The advantages of uni-directional Ethernet may be included under 802.3 by disabling the full duplex requirement of the Media Access Controller (MAC) sub layer in the Data Link Layer supporting the Physical Interface in the Open System Interconnection (OSI) Reference Model. Various alternatives solutions have been used to disable the duplex requirement of the MAC devices including (i) designing non-compliant MAC devices; (ii) providing electrical loop-back of transmit signals to the MAC device, and (iii) providing optical loop-back of transmit signals to the MAC. All of the described alternative solutions are of limited practicality, particularly for small form—factor pluggable modules (SFP) used in Ethernet communications. SFPs are compact, hot-pluggable transceivers used for both telecommunication and data communications and are commercially available from a number of companies including Optical Communication Products (OPC), Woodland Hills, Ca; Canary Communications, Morgan Hill, Ca. and others.

The present invention brings the advantages of uni-directional Ethernet traffic to 802.3 LANs for extended communication services requiring only the usage/connection of a single fiber and providing a mechanism to maintain a link up condition on a compliant Ethernet MAC device for any hardware that accepts SFP modules. A feed back loop from a MAC device transmit terminal to its receive terminal includes (i) a controlled SFP socket and (ii) a SFP module engaged with the socket, the module including a splitter and active device to maintain the receive terminal in an uplink condition during transmission thereby simulating full duplex communication for 802.3 LAN communications.

SUMMARY

A device and method provide uni-directional Ethernet (UDE) traffic on an 802.3 optical LAN. The UDE signals are delivered to a MAC/PHY device for transmission to the LAN. A small factor form pluggable (SFP) module is activated by a SFP control interface to receive the UDE signals from the MAC/PHY device at a transmit terminal and deliver the signals to a laser within the SFP module. Optionally, an infra red detection device for eye safety purposes may be activated to control turn on the laser after connection of the laser to a optical transmission fiber. The laser transmits the UDE signals to the transmission fiber via a splitter within the SFP module. A portion of the splitter signal activates a photodiode within the module to maintain the receive terminal in an uplink condition during transmission of the UDE to the LAN thereby simulating full duplex operation. Alternatively, the UDE signal maybe looped back directly to the receive terminal to maintain the MAC device in an uplink condition for simulation of the full duplex communication requirement of the 802.3 standard. The SFP control interface deactivates the SFP module, turning off the laser; the photodiode and resetting the infra red detection device, when the UDE transmission is completed.

DRAWINGS

Figure 2:
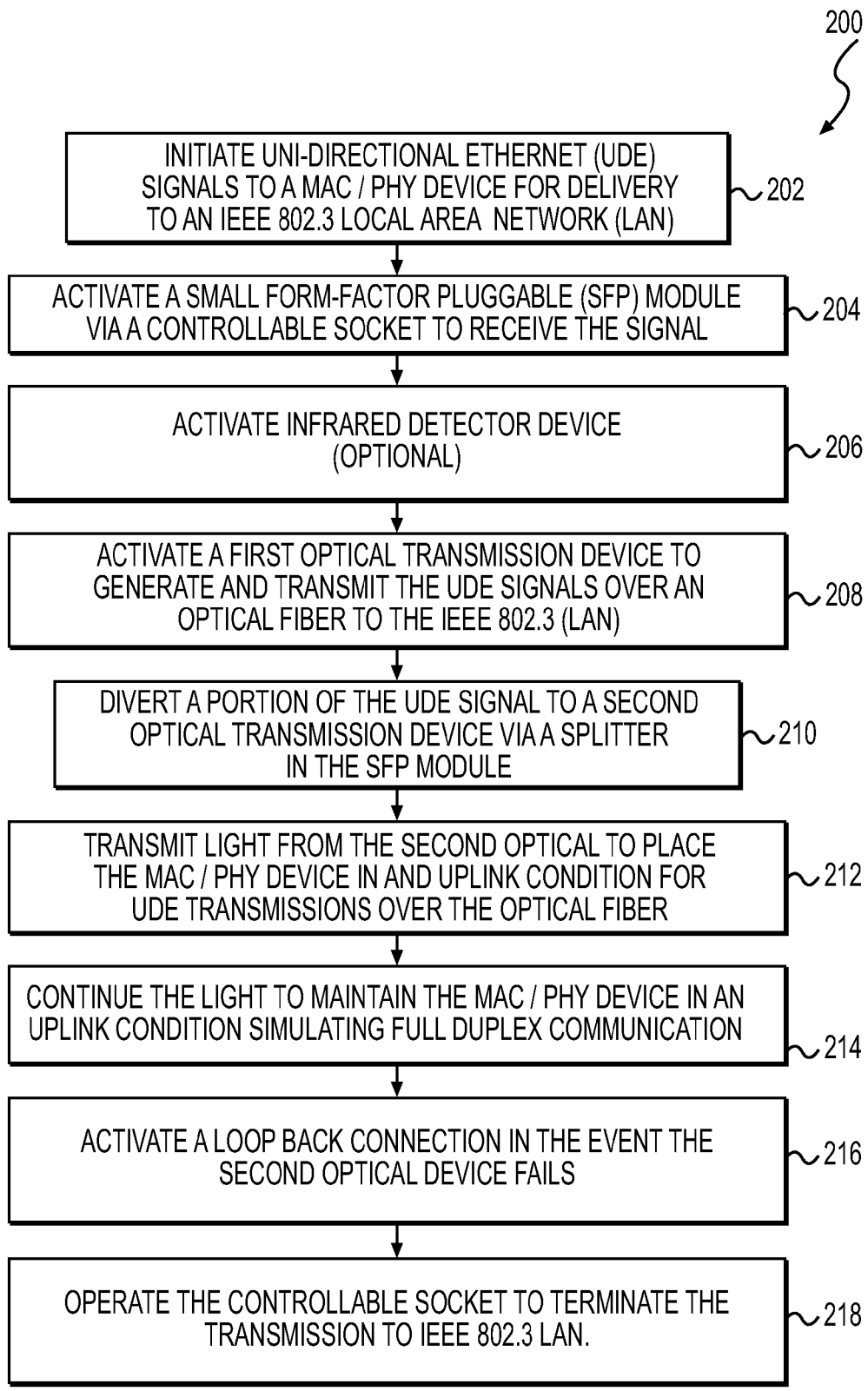

FIG. 1 is a representation of a SFP device providing uni-directional Ethernet optical traffic on IEEE 802.3 LANs and incorporating the principles of the present invention, and FIG. 2 is a flow diagram of a method for implementing uni-directional Ethernet optical traffic on 802.3 LANs using the device of FIG. 1.

DESCRIPTION OF PREFERRED EMBODIMENTS

Referring to FIG. 1, an exemplary embodiment of a SFP device 100 is shown connected to a printed circuit board 102 and coupled to a MAC/PHY device 104 for providing uni-directional Ethernet (UDE) signals to an optical circuit (not shown) in an IEEE 802.3 LAN. The device or module 100 engages the MAC/Phy device 104 via a standard SFP socket 106. The socket is responsive to an SFP Control Interface 108 for activation/deactivation to receive/terminate series intermediate frequency uni-directional Ethernet (UDE) signals 110 transmitted from the MAC/PHY device 104 via transmit terminal 112 to the module 100 for delivery to the optical LAN (not shown).

When the socket 106 is activated by the interface 108, under control of an operator (not shown), the series IF—UDE signal 110 is delivered to the SFP module 100, the module including a laser 114, typically a commercially available semiconductor laser; a splitter 120, and a light emitting device 12, typically a standard photo diode. The module delivers the signal 110 to an optical fiber 116. Optionally, a commercially available infra red detection device 118 may be attached to the module 110 for eye safety purposes. The device 118 would be interlocked with the laser to turn on the laser only when the transmit fiber 116 is connected to the laser.

In one embodiment, the optical splitter 120 splits off and directs a portion of the UDE signal 110 to activate the photo diode device 122 generating and directing light on a receive terminal 124 of the MAC/Phy device 104. Alternatively, the splitter may take place in the electrical domain prior to the laser or photodiode. In any event, the diode light maintains the MAC/PHY device 104 in a link up condition for UDE transmissions on the optical fiber 116 to simulate full duplex communications required by the IEEE 802.3 standard. When the interface circuit 108 is operated to turn off the socket 106, the transmission of UDE optical signals terminates.

In another embodiment, a loopback connection 128 may be installed and activated in the event the photo diode 122 should fail to operate for UDE transmissions.

Referring to FIG. 2, a method 200 provides uni-directional Ethernet (UDE) traffic to an IEEE 802.3 LAN.

An operation 202 initiates UDE signals for delivery to a MAC/PHY device 104 and transmission to an IEEE 802.3 optical LAN (not shown) via an optical fiber 116.

An operation 204 activates a SFP module 100 via the control circuit 108 to receive the UDE signals from the MAC/PHY device at the transmit terminal 112 and deliver the signals to a first optical device 114 in the SFP module 100.

Optionally, an operation 206 may activate an infra red detection device 118 to control turn on of a first optical device 114 in the SFP module after connection to the optical fiber 116.

An operation 208 activates the first optical device 114 to generate and transmit the UDE signals over the optical fiber 116.

An operation 210 diverts a portion of the UDE signals to a second optical device 122 via a splitter 120 in the SFP module 122.

An operation 212 transmits light from the second optical device to place the MAC/PHY device in an uplink condition for uni-directional UDE transmissions over the optical fiber.

An operation 214 continues the light to maintain the MAC/PHY device in an uplink condition during transmission of the UDE signals for simulating full duplex communication to the IEEE 802.3 LAN.

An operation 216 activates the loopback connection 124 in the event the second optical device fails to operate.

An operation 218 activates the interface 108 to deactivates the SFP module 100 when the UDE transmission is completed and the process 200 ends, turning off the first and second optical devices, and resetting the infra red detection device.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention have been described in detail, it should be understood that the various changes, substitutions, and alterations could be made hereto without departing from the spirit and scope of the invention.

What is claimed is:

1. A device, comprising:
(a) a communication network access device adapted for duplex communication and providing transmit and receive signal paths;
(b) a controllable socket coupled to the transmit and receive signal paths and linked to a control interface for activating/deactivating the controllable connector, and
(c) a pluggable module coupled to the transmit and receive signal paths in an activated status via the controllable socket and to a transmission path carrying uni-directional signals, the module including a first optical device and a splitter in the transmission path and coupled to a second optical device via the splitter, the second optical device responsive to a portion of the uni-directional signals provided by the splitter for placing the communication access device in a link up condition for uni-directional signals provided by the first optical device to the transmission path.

2. The device of claim 1 wherein the uni-directional signals are Ethernet generated (UDE).

3. The device of claim 1 further comprising:
(d) an infra red detection device interlocked with the first optical device to control turn on of the first optical device when connected to the transmission path external to the module.

4. The device of claim 1 further comprising:
(d) a loopback connection between the transmit and receive signal paths for activation upon failure of the second optical device to operate.

5. The device of claim 1 wherein the first optical device is a laser.

6. The device of claim 1 wherein the second optical device is a light emitting diode.

7. The device of claim 2 wherein the UDE signals are transmitted as pulses.

8. The device of claim 1 wherein the communication access device is a Media Access Control device.

9. A method, comprising:
(a) initiate uni-directional Ethernet (UDE) signals for delivery to a communication access device and transmission to an IEEE 802.3 optical LAN via an optical fiber;
(b) activate a small form-factor pluggable (SFP) module via a controllable socket to receive the UDE signals from the communication access device and deliver the signals to a first optical transmission device;
(c) activate the first optical transmission device to generate and transmit the UDE signals over the optical fiber;
(d) divert a portion of the UDE signal to a second optical transmission device via a splitter for transmitting light to place the communication access device in and uplink condition for UDE transmissions over the optical fiber;
(e) continuing the light to maintain the communication access device in an uplink condition during transmission of the UDE signals to the IEEE 802.3 LAN for simulating full duplex communication; and
(f) operating the controllable socket to terminate the transmission to the IEEE 802.3 LAN.

10. The method of claim 9 further comprising:
(g) activating a loopback connection from a transmit path to a receive path in the event the second optical transmission device fails to operate.

11. The method of claim 9 further comprising:
(h) operating a light sensitive device to control turn on of the first optical transmission device to occur after connection to the optical fiber.

12. The method of claim 9 wherein the first optical transmission device is a laser.

13. The method of claim 9 wherein the second optical transmission device is a light emitting device.

14. The method of claim 9 wherein the communication access device is a Media Access Control device.

15. A non-transitory computer readable medium containing program instructions for allowing uni-directional traffic on local area networks (LANs), executable on a computer system, comprising:
(a) program instructions for initiating uni-directional Ethernet (UDE) signals for delivery to a communication access device and transmission to an IEEE 802.3 LAN via an optical fiber;
(b) program instructions for activating a small form-factor pluggable (SFP) module via a controllable socket to receive the UDE signals from the communication access device and deliver the signals to a first optical transmission device;

(c) program instructions for activating the first optical transmission device to generate and transmit the UDE signals over the optical fiber;

(d) program instructions for diverting a portion of the UDE signal to a second optical transmission device via a splitter for transmitting light to place the communication access device in and uplink condition for UDE transmissions over the optical fiber;

(e) program instructions for continuing the light to maintain the communication access device in an uplink condition during transmission of the UDE signals to the IEEE 802.3 LAN for simulating full duplex communication; and (f) program instructions for operating the controllable socket to terminate the transmission to the IEEE 802.3 LAN.

16. The non-transitory computer readable medium of claim 15 further comprising:

(g) program instructions for activating a loopback connection from a transmit path to a receive path in the event the second optical transmission device fails to operate.

17. The non-transitory computer readable medium of claim 15 further comprising:

(h) program instructions for operating a light sensitive device to control turn on of the first optical transmission device to occur after connection to the optical fiber.

18. The non-transitory computer readable medium of claim 15 wherein the first optical transmission device is a laser.

19. The non-transitory computer readable medium of claim 15 wherein the second optical transmission device is a light emitting device.

20. The non-transitory computer readable medium of claim 15 wherein the communication access device is a Media Access Control device.

\* \* \* \* \*